March 18, 1958 I. E. LEVY ET AL 2,827,598

METHOD OF ENCASING A TRANSISTOR AND STRUCTURE THEREOF

Filed March 19, 1953

INVENTORS
IRVING E. LEVY
EDMUND S. MOCKUS
ALBERT B. SPYUT
BY
ATTORNEY

United States Patent Office
2,827,598
Patented Mar. 18, 1958

2,827,598

METHOD OF ENCASING A TRANSISTOR AND STRUCTURE THEREOF

Irving E. Levy, Malden, Edmund S. Mockus, West Newton, and Albert B. Spyut, Waltham, Mass., assignors to Raytheon Manufacturing Company, Newton, Mass., a corporation of Delaware Application March 19, 1953, Serial No. 343,336

8 Claims. (Cl. 317—235)

This invention relates to a novel method of packaging a transistor in a metal case and to the structure thereof.

In the final assembly of transistors, one of the primary objectives is to provide the transistor with a case which will give it maximum mechanical stability and protection from contaminants.

This invention involves a two-sectional cylindrical metal case which is used to house and hermetically seal the transistor components therein, and a welding apparatus which is employed to join the two sections of the case. The first section of the case comprises a metal sleeve through which the transistor leads have been sealed and insulated one from the other. These leads are connected in turn to the transistor components. The second section of the case is a metal envelope which is used to cover the transistor components. The envelope is also provided with a tubulation or an opening whereby the transistor may be evacuated or filled with a protective gas and hermetically sealed. The first and second sections are then held together in a pair of supports which are rotated as a current is applied to the adjoined edges of the two sections of the transistor case to weld them together. However, semiconductor materials are very sensitive to changes in temperature, so it is quite important to prevent heat from reaching the transistor components during the welding process. Thus the welding cycle used is of the order of a fraction of a second and the supports are made of a high heat conductive material, such as copper, for example, so that the heat generated during the welding operation is rapidly conducted away from the transistor components within the envelope and the semiconductor material is not impaired. The envelope may then be evacuated or filled with a protective gas, such as argon, and hermetically sealed. The finished package is adaptable for high-speed manufacturing techniques, small in size, mechanically rugged and the transistor components are protected from contaminants which might otherwise affect the operation of the transistor.

This invention and the features thereof will be understood more clearly and fully from the following detailed description of exemplifications of the invention with reference to the accompanying drawing wherein.

Figures 1, 2, 3, 4, 5:
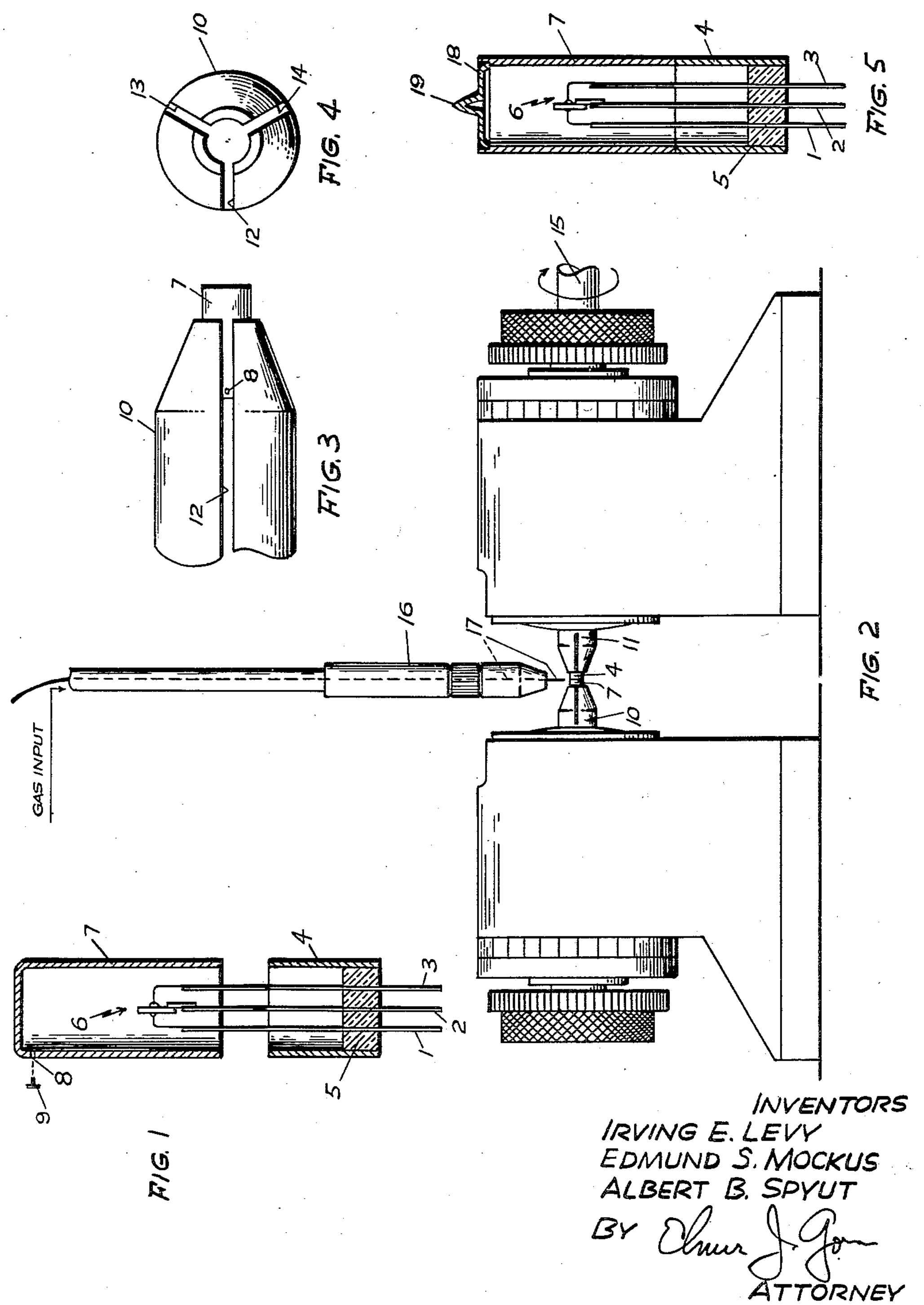
Fig. 1 is an exploded view of a transistor assembly made in accordance with this invention.
Fig. 2 is a view of the welding apparatus used to join the envelope to the sleeve.
Fig. 3 is a view of one of the two supports used to hold the metal envelope and the sleeve during the welding process.
Fig. 4 is an end view of the support shown in Fig. 3.
Fig. 5 is a cross-sectional view of a finished transistor assembly made in accordance with this invention.

Referring now to Fig. 1, a transistor assembly made in accordance with this invention includes three transistor leads 1, 2 and 3 which are insulated from each other by supporting and sealing the center sections of the leads in a glass base. This base is then mounted within a metal sleeve 4 by forming a glass-to-metal seal 5. The leads 1, 2 and 3 may be made from dumet wire or any conducting material having a coefficient of expansion which is close to that of glass. Since it is known that temperatures above 125 degrees C. may be destructive for transistors and any rise above room temperature is undesirable, the upper extensions of the leads 1, 2 and 3 should be of sufficient length to substantially remove the transistor components 6 from the upper edge of sleeve 4. This aids in preventing damage to these components when a seam weld is made at that edge. Although a diffused junction transistor is shown for purposes of illustration, the transistor components 6 may be varied as desired and are not limited to any single type. Likewise, the leads 1, 2 and 3 may be increased or decreased in number to conform with the type of transistor being encapsulated. The sleeve 4 should be made of nickel, for example, or any metal which will not rust when exposed to moisture. The sleeve 4 should also be adaptable to inert gas welding techniques, and should be oxide-coated to facilitate the ease with which a glass-to-metal seal 5 may be made.

Fig. 1 also shows a cylindrical metal envelope 7 which has a diameter equal to that of the sleeve 4 and is open at one end. The envelope contains a small opening 8 through an upper part of the wall to allow air to escape from the envelope during the welding process. The opening 8 is also used to evacuate the envelope or fill it with a protective gas. The metal envelope 7 should be made preferably of nickel, but other materials which will not rust and which may be readily welded to the sleeve 4 can be used as well. The envelope 7 should be of sufficient size to enclose the transistor components 6 without touching them when the rim of the envelope abuts the upper edge of the sleeve 4. A pin 9 is used to close the opening 8 and hermetically seal the envelope 7 after it has been welded to the sleeve 4.

Referring now to Fig. 2, a welding apparatus of the type used to seam-weld the envelope 7 to the sleeve 4 is shown. The envelope 7 is placed in one of a pair of equivalent supports 10 and 11, and the sleeve 4 with the transistor components 6 and the leads 1, 2, and 3 connected thereto are placed in the other. An enlarged view of a support 10 holding an envelope 7 is shown in Fig. 3. It should be noted that the supports 10 and 11 are made of a metal which has a high-heat conductivity. Copper has been used successfully for this purpose. Thus, when the envelope 7 and the sleeve 4 are welded together, the heat generated during this process is conducted away from the area of the weld by the supports 10 and 11 which also act as heat sinks, and the transistor components 6 are not harmed. These supports also prevent a thermal shock from occurring within the sleeve 4 which might otherwise break the glass-to-metal seal 5.

The supports 10 and 11 are slotted in structure, as shown by a slot 12 in Fig. 3 and the slots 12, 13, and 14 in Fig. 4. These slots allow the pressure on the envelope 7 and the sleeve 4 to be varied and properly adjusted to hold the envelope and sleeve in a fixed position. One of the slots, such as the slot 12 in Fig. 3, should be aligned with the opening 8 in the envelope 7 so that during the welding process air may escape from the envelope as heating occurs therein. If the opening 8 is improperly aligned, that is, if it is covered by the support 10, a hole may be blown in the seam-weld by air pressure which tends to build up within the envelope during the welding process. The supports 10 and 11 should also substantially overlap the areas in which the transistor components 6 and the seal 5 are located so that heat may be rapidly transferred from these areas. The supports 10 and 11 are tapered at the end to provide easy access to the parts to be welded. However, the design of the supports 10 and 11 may be varied as desired so long as means for allowing air to escape from the envelope 7 are provided and the material used to form the supports is of high-heat conductivity.

Referring again to Fig. 2, the supports 10 and 11 may be rotated at the same speed by turning a shaft 15 which is, in turn, connected by a set of gears, not shown, to the supports 10 and 11. The envelope 7 and the sleeve 4 are placed in the supports 10 and 11, and are brought in contact with each other so that the rim of the envelope 7 abuts the upper edge of the sleeve 4. A welding tool 16, such as an inert gas welding tool of the heli-arc type, may be used to seam-weld the envelope 7 to the sleeve 4. Such a welding tool contains a thoriated tungsten electrode 17 which is used to apply a current to the area to be welded. It is designed so that an inert gas may be supplied to the area adjacent to the tip of the electrode 17. In the welding tool 16, shown in Fig. 2, the inert gas, such as helium, for example, is driven into the top of the tool so that it will flow downward and out of the welding tool at the point where the tip of the electrode 17 emerges therefrom. The helium gas prevents oxidation from affecting the weld and also allows the heat to penetrate deeper into the welding area so that a stronger weld can be made. The welding tool 16 is positioned and fixed so that the tip of the electrode 17 is adjacent to the adjoined edges of the envelope 7 and the sleeve 4 as shown in Fig. 2. A heli-arc welding apparatus of the type described has been used quite successfully to provide a smooth seam-weld which is free of craters or pores. However, other welding techniques which provide equivalent results may be used for the purposes of this invention as well. The supports 10 and 11 are rotated about the same axis and the welding current is applied to the adjoined rim of the envelope 7 and the edge of the sleeve 4. A motor, not shown, having a speed of 172 R. P. M. has been used successfully to rotate the shaft 15 and the supports 10 and 11, and at that speed a welding cycle of approximately one-third of a second is sufficient to join the sleeve 4 and the envelope 7. The high heat-conductive supports 10 and 11 rapidly transfer the heat generated from the area of the weld so that the transistor components 6 and the seal 5 are not injured. Also, by making the leads 1, 2 and 3 long enough to substantially remove the transistor components 6 from the area being welded, the heating effects during that process are decreased. Air within the envelope 7 which might otherwise expand and blow out the weld escapes through the opening 8 and a slot 12, as shown in Fig. 3. The envelope 7 may now be evacuated or filled with a protective gas, such as argon, and hermetically sealed by using techniques well known within the art. In this particular embodiment of the invention, a pin 9, as shown in Fig. 1, may be used to close the opening 8 to form the hermetic seal.

Fig. 5 shows another embodiment of the invention in the form of a transistor assembly which is identical in all respects to the one shown in Fig. 1, with the exception that the opening 8 has been omitted as a means for evacuating the envelope 7. In place of the opening 8, a tubulation 18 has been provided to allow air to escape during the welding process and to hermetically seal the envelope. The tubulation 18 may be a flanged copper tube, for example, which has been soldered to an envelope 7. The tubulation 18 should be joined to the envelope 7 before the welding process is begun and should be open at the point which is shown as a pinched-off tip 19 in Fig. 5. This tubulation is pinched off to form a hermetic seal after the envelope 7 has been welded to the sleeve 4 and filled with a protective gas or evacuated.

However, this invention should not be limited to the particular details described above as many equivalents will suggest themselves to those skilled in the art. For example, the glass-to-metal seal 5 could be replaced with any insulating material which will form a hermetic seal with the sleeve 4. Also, the finished assembly described above, although cylindrical in shape, could be of a rectangular shape as well. Likewise, copper tubing was used to form the tubulation 18, but any material capable of being pinched-off to form a hermetic seal could be substituted for this member. Furthermore, a heli-arc welding apparatus has been used successfully to weld the envelope 7 to the sleeve 4, but other welding methods may be used if they do not injuriously heat the transistor components 6 or affect the seal 5. Also, the welding process may be changed so that the envelope 7 and the sleeve 4 remain stationary during the welding process while the welding tool 16 is rotated about the arc to be welded. Therefore, it is desired that the appended claims be given a broad interpretation commensurate with the scope of the invention within the art.

What is claimed is:

1. A transistor package comprising a metal sleeve, an insulating member sealing one end of said sleeve, the other end of said sleeve having an edge substantially removed from said insulating member, a set of leads insulatingly sealed through said insulating member, a transistor connected to said leads and substantially removed from the edge of said sleeve, a metal envelope positioned over and separated from said transistor, said envelope being welded to said edge.

2. A transistor package comprising a metal sleeve, an insulating member sealing one end of said sleeve, the other end of said sleeve having an edge substantially removed from said insulating member, a set of leads insulatingly sealed through said insulating member, a transistor connected to said leads and substantially removed from the edge of said sleeve, a metal envelope positioned over and separated from said transistor, said envelope being welded to said edge and a protective gas within said envelope.

3. A transistor package comprising a metal sleeve, an insulating member sealing one end of said sleeve, the other end of said sleeve having an edge substantially removed from said insulating member, a set of leads insulatingly sealed through said insulating member, a transistor connected to said leads and substantially removed from the edge of said sleeve, a metal envelope positioned over and separated from said transistor, said envelope being welded to said edge, and a tubulation connected to said envelope for evacuating said envelope.

4. The method of encasing a transistor which consists in sealing a set of spaced leads through an insulating member and sealing said insulating member in one end of a metal sleeve, connecting a transistor to said set of spaced leads after said insulating member has been sealed to said sleeve, supporting said sleeve and a metal envelope in a pair of highly heat-conductive supports, said supports being positioned to substantially overlap said sleeve and said envelope, positioning said envelope over said transistor until the rim of said envelope abuts the edge of said sleeve and said transistor is a predetermined distance and substantially removed from said rim and said edge, applying a welding current to said rim and said edge and sustaining said current for a period of short duration to form a seam weld.

5. The method of encasing a transistor which consists in sealing a set of spaced leads through an insulating member and sealing said insulating member in one end of a metal sleeve, connecting a transistor to said set of spaced leads after said insulating member has been sealed to said sleeve, supporting said sleeve and a metal envelope in a pair of highly heat-conductive supports, said supports being positioned to substantially overlap said sleeve and said envelope, positioning said envelope over said transistor until the rim of said envelope abuts the edge of said sleeve and said transistor is a predetermined distance and substantially removed from said rim and said edge, relatively rotating said envelope and said sleeve with respect to a welding electrode, applying a welding current to said rim and said edge and sustaining said current for a period of short duration to form a seam weld.

6. The method of encasing a transistor which consists in sealing a set of spaced leads through an insulating member and sealing said insulating member in one end of a metal sleeve, connecting a transistor to said set of spaced leads after said insulating member has been sealed to said sleeve, supporting said sleeve and a metal envelope in a pair of highly heat-conductive supports, said envelope having an opening therein and said supports being positioned to substantially overlap said sleeve and said envelope, positioning said envelope over said transistor until the rim of said envelope abuts the edge of said sleeve and said transistor is a predetermined distance and substantially removed from said rim and said edge, applying a welding current to said rim and said edge, sustaining said current for a period of short duration to form a seam weld and hermetically sealing said opening.

7. The method of encasing a transistor which consists in sealing a set of spaced leads through an insulating member and sealing said insulating member in one end of a metal sleeve,, connecting a transistor to said set of spaced leads after said insulating member has been sealed to said sleeve, supporting said sleeve and a metal envelope in a pair of highly heat-conductive supports, said envelope having an opening therein and said supports being positioned to substantially overlap said sleeve and said envelope, positioning said envelope over said transistor until the rim of said envelope abuts the edge of said sleeve and said transistor is a predetermined distance and substantially removed from said rim and said edge, applying a welding current to said rim and said edge, sustaining said current for a period of short duration to form a seam weld, filling said envelope with a protective gas and hermetically sealing said opening.

8. The method of encasing a transistor which consists in sealing a set of spaced leads through an insulating member and sealing said insulating member in one end of a metal sleeve, connecting a transistor to said set of spaced leads after said insulating member has been sealed to said sleeve, supporting said sleeve and a metal envelope in a pair of highly heat-conductive supports, said envelope having a tubulation connected thereto and said supports being positioned to substantially overlap said sleeve and said envelope, positioning said envelope over said transistor until the rim of said envelope abuts the edge of said sleeve and said transistor is a predetermined distance and substantially removed from said rim and said edge, relatively rotating said envelope and said sleeve with respect to a welding electrode, applying a welding current in an inert atmosphere to said rim and said edge, sustaining said current for a period of the order of a fraction of a second to form a seam weld, evacuating said envelope and hermetically sealing said tubulation.

References Cited in the file of this patent

UNITED STATES PATENTS

| | | |
|---|---|---|
| 2,277,871 | Mitchell et al. | Mar. 31, 1942 |
| 2,584,461 | James et al. | Feb. 5, 1952 |
| 2,595,475 | McLaughlin | May 6, 1952 |
| 2,626,985 | Gates | Jan. 27, 1953 |
| 2,661,448 | Rodgers | Dec. 1, 1953 |
| 2,664,528 | Stelmak | Dec. 29, 1953 |